United States Patent [19]

Gavinet et al.

[11] 4,004,443
[45] Jan. 25, 1977

[54] DYNAMIC SEALING DEVICE FOR HIGH-TEMPERATURE AND HIGH-PRESSURE OPERATION

[75] Inventors: Jean Gavinet, Orsay; Louis Segurens, Verrieres-le-Buisson, both of France

[73] Assignee: Commissariat a l'Energie Atomique, Paris, France

[22] Filed: Apr. 4, 1974

[21] Appl. No.: 458,056

Related U.S. Application Data

[60] Continuation of Ser. No. 355,169, April 27, 1973, abandoned, which is a continuation of Ser. No. 170,648, Aug. 10, 1971, abandoned, which is a division of Ser. No. 860,539, Sept. 24, 1969, abandoned.

[30] Foreign Application Priority Data

Oct. 16, 1968    France ........................... 68.170163
July 2, 1969     France ........................... 69.22376

[52] U.S. Cl. .............................. 72/253 R; 277/170
[51] Int. Cl.² ......................................... B21C 23/00
[58] Field of Search .......... 277/168, 170, 171, 172, 277/236; 72/266, 273, 41, 253; 92/247, 206

[56] References Cited

UNITED STATES PATENTS

| 1,862,981 | 6/1932 | Rabezzana | 277/168 |
| 3,150,889 | 9/1964 | Watts | 277/115 X |
| 3,169,455 | 2/1965 | Hoffman | 92/247 |
| 3,285,631 | 11/1966 | Stozpman | 277/236 X |
| 3,459,369 | 8/1969 | Marks | 277/115 X |

Primary Examiner—Samuel B. Rothberg
Attorney, Agent, or Firm—Cameron, Kerkam, Sutton, Stowell & Stowell

[57] ABSTRACT

A pressure-tight assembly which can constitute a dummy block for an extension ram is made up of two coaxial components arranged in spaced relation to accommodate at least one peripheral seal. One component has a small flat bearing surface extending at right angles to the axis and the other component has a bearing surface which is inclined to the axis. The resultant of the forces exerted on the seal which is imprisoned between said bearing surfaces causes preferential creep deformation of the seal towards the exterior of the assembly.

2 Claims, 13 Drawing Figures

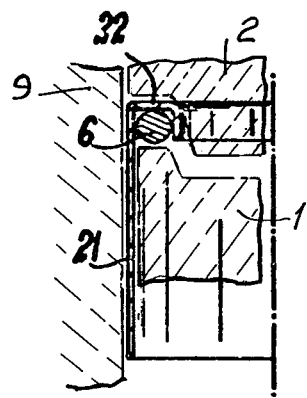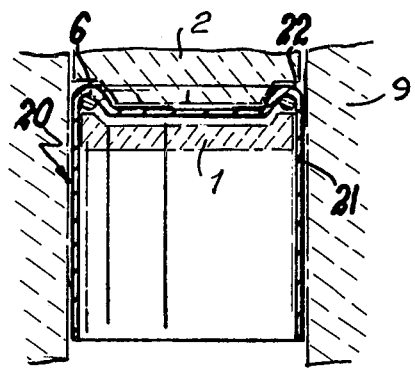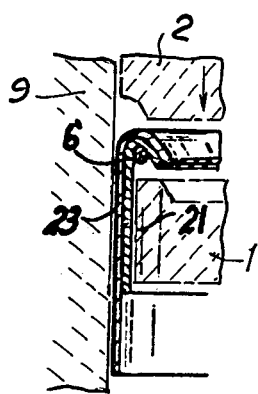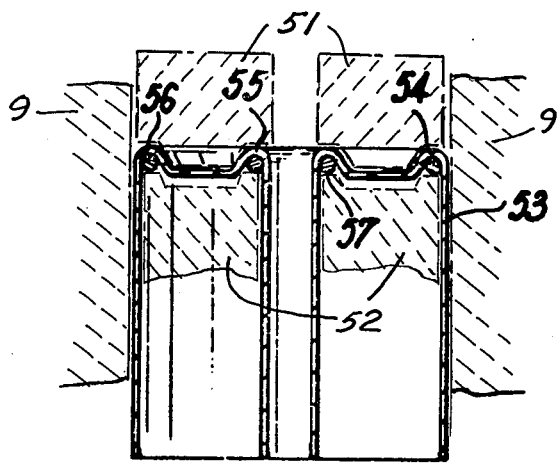

DYNAMIC SEALING DEVICE FOR HIGH-TEMPERATURE AND HIGH-PRESSURE OPERATION

This is a Continuation, of application Ser. No. 355,169, filed Apr. 27, 1973 and now abandoned; a continuation of Ser. No. 170,648, filed Aug. 10, 1971, and now abandoned; a division of Ser. No. 860,539, filed Sept. 24, 1969, and now abandoned.

This invention relates to a dynamic sealing device which is capable of ensuring leak-tightness under high pressure between two parts which are displaced in relative motion in a high-temperature atmosphere. Although other potential applications may be contemplated, the invention is particularly well suited to presses for hot extrusion of metal billets. Thus, the dynamic sealing device ensures pressure-tightness between the ram of the press and the internal surface of the cylindrical chamber which contains the billet and an extrusion lubricant, one notable result thereby achieved being to prevent said lubricant from passing out of the extrusion cylinder at the ram end of this latter under the action of the pressure exerted on the billet.

In hot extrusion presses of known types, the ram is applied against the rear face of the billet, the front face of the billet is in contact with the die which closes the extrusion cylinder at one end and the extrusion ram is intended to penetrate into said cylinder at the opposite end. At the operating temperature, the billet is deformed under the action of compressive forces and applied against a large portion of the internal surface of the extrusion cylinder; as the pressure continues to increase, the metal of the billet becomes plastic and flows out of the cylinder through the die orifice by reason of the fact that the thrust of the metal overcomes the frictional stresses at the internal surface of the cylinder and at the die face. But if certain precautions are not taken, this process results in appreciable abrasion of the cylinder and die components and surface flaws appear in the extruded product. Particles of metal are also liable to be torn away from the cylinder walls or from the die, thereby causing contamination of the extruded product. The possibility of failure or seizure of tools is a further hazard which should be taken into consideration. Moreover, the deformation of a metal billet under high pressure and at high temperature within a closed chamber and through a die which has to be maintained at lower temperatures presents lubrication problems which are difficult to solve. In fact, under the high pressures developed in a press of this known type, only a low degree of pressure-tightness is provided by the ram. In consequence, a part of the lubricant escapes as soon as the billet is inserted into the cylinder and also throughout the extrusion operation proper, thereby rapidly giving rise to faulty lubrication.

The aim of this invention is to provide a dynamic sealing system which makes it possible to overcome the disadvantages referred-to in the foregoing, particularly in the case of a hot extrusion press and even more especially when the metal which constitutes the billet has high mechanical strength.

To this end, the device under consideration which comprises two supporting members adapted to interengage with clearance along a common axis of application of a thrust on said members and a seal imprisoned between said members in the vicinity of the periphery thereof, is characterized in that the first of said members has a flat bearing surface of small cross-sectional area which is applied against said seal and extends at right angles to said axis and the second of said members has an inclined bearing surface which is also applied against said seal but in the direction of the exterior of said second member, the application of said members one against the other being intended to subject said seal within said clearance to creep deformation under pressure towards the exterior of said members under a compressive force which is greater than said thrust in the ratio of the area of said flat bearing surface to the area of application of said thrust on said members.

The seal which is employed can consist of a metallic O-ring or can comprise a thin metallic cylindrical skirt terminating at one end in an inwardly directed and substantially circular flange which covers the O-ring seal.

The axial thrust which is thus exerted on the supporting members is transmitted to the seal which is imprisoned between said members with a multiplying effect in the ratio of the area on which the thrust is exerted on the members to the smaller area of the bearing surfaces on which said members are applied against the seal. Moreover, and by reason of the orientation of the seal bearing surfaces, said thrust is transmitted in two preferential directions: the first direction corresponds to the reaction of the seal on the flat bearing surface of the first member, said reaction being directed parallel to the common axis, whilst the second direction extends at right angles to the inclined bearing surface of the second member and consequently towards the exterior of this latter. The resultant of the forces applied to the seal which is consequently greater than the forces produced by each supporting member separately gives rise under these conditions to a preferential orientation of the creep deformation of the seal towards the exterior of said members, thereby providing dynamic pressure-tightness between said members on the one hand in the vicinity of the seal and on the other hand in the vicinity of any adjacent surface with respect to which said members carry out a movement of displacement as a result of the thrust to which they are subjected.

By virtue of the directional creep stress which is thus applied to the seal, any irregularity or defect exhibited by the opposite surfaces as these latter undergo relative displacement as well as any variation in the thrust on the supporting members can be readily absorbed. In fact, the resultant of the forces applied to the seal is maintained at each instant at a constant value which is greater than the individual force produced by each member considered separately and which is dependent only on the force of application of said members. The above-mentioned variations either in state of surface or in the thrust lead in fact only to a complementary and immediate deformation of the seal and to a corresponding "consumption" of this latter without entailing any danger of failure of the pressure-tightness obtained.

Numerous embodiments of the device under consideration may be contemplated, especially when it is required to obtain pressure-tightness of this order under high temperature and high pressure. In particular in the case of a hot extrusion press, the device in accordance with the invention can be directly carried by the ram of the press or interposed between said ram and the billet to be extruded while performing the function of a thrust block or so-called "dummy" block. The extrusion process can be carried out both on solid billets or on tubular elements; especially in the latter case in which the ram of the press is fitted in the conventional manner with an axial mandrel which traverses the die cavity, said device cam comprise a double cylindrical skirt having two circular flanges associated with two O-rings, said supporting members being provided with two flat bearing surfaces and two inclined bearing surfaces adapted to cooperate respectively with the two O-rings in order to ensure the application of said seal on the one hand against the internal surface of the extrusion cylinder and on the other hand against the external surface of the mandrel.

Finally, in accordance with an improvement of the device under consideration which makes it possible on the one hand to facilitate the positioning and the withdrawal of the two supporting members at the beginning and the end of the extrusion operation and on the other hand to enhance operational safety which is of major importance in high-pressure and high-temperature applications, the two supporting members are interassembled by means of a unidirectional coupling which leaves said members free in the direction in which creep deformation occurs but rigidly couples said members in the opposite direction.

As an advantageous feature, the coupling between said members is carried out by means of at least one cylindrical cap screw which passes freely through one of said members and is adapted to cooperate with a screw-thread formed in a blind-end bore of the other member.

The properties and advantages of the dynamic sealing device in accordance with the invention will in any case become apparent from the following description of a number of examples of construction which are given by way of indication but not in any limiting sense, reference being made to the accompanying drawings, in which:

FIGS. 5, 6 and 7 are fragmentary sectional views illustrating a number of possible alternative forms of the seal which is employed;

Figure 1:
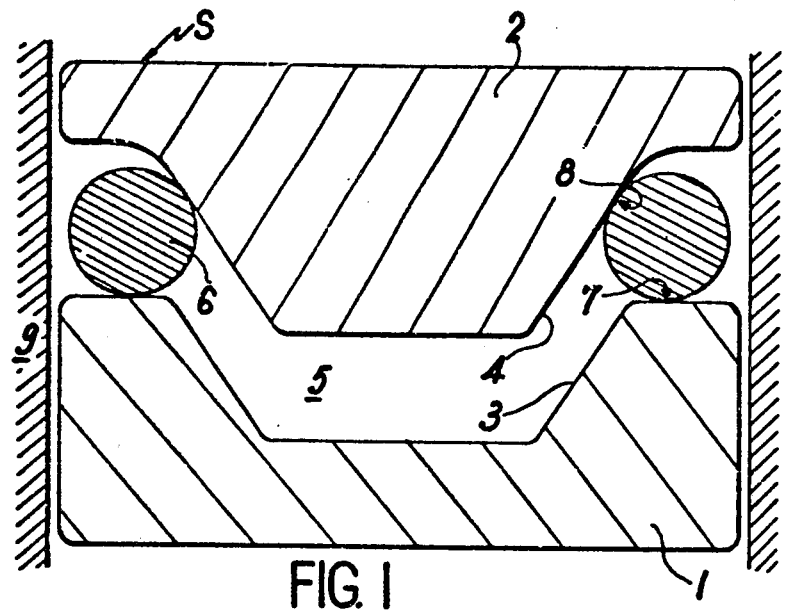
FIGS. 1, 2 and 3 are sectional views of the device under consideration which are primarily intended to show the progressive deformation of the seal as produced by the supporting members under the action of a thrust exerted axially on said members.
Figure 2:
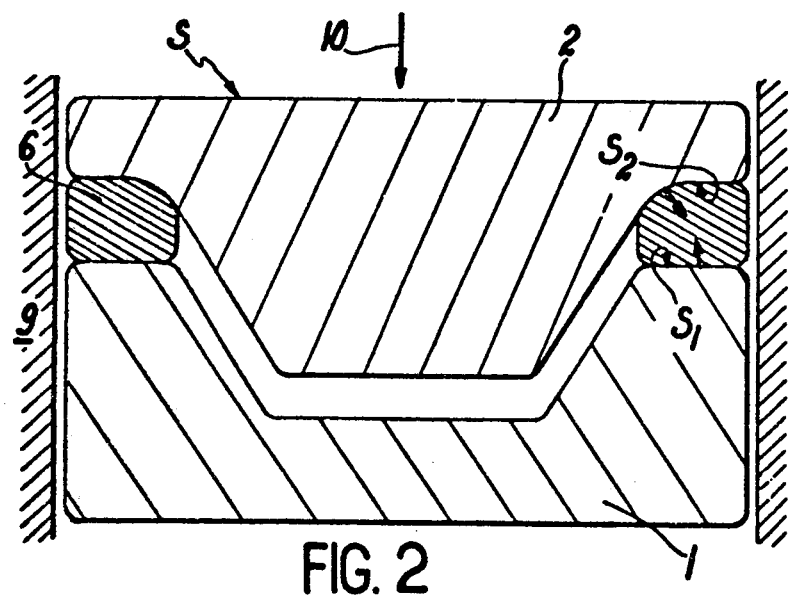
Figure 3:
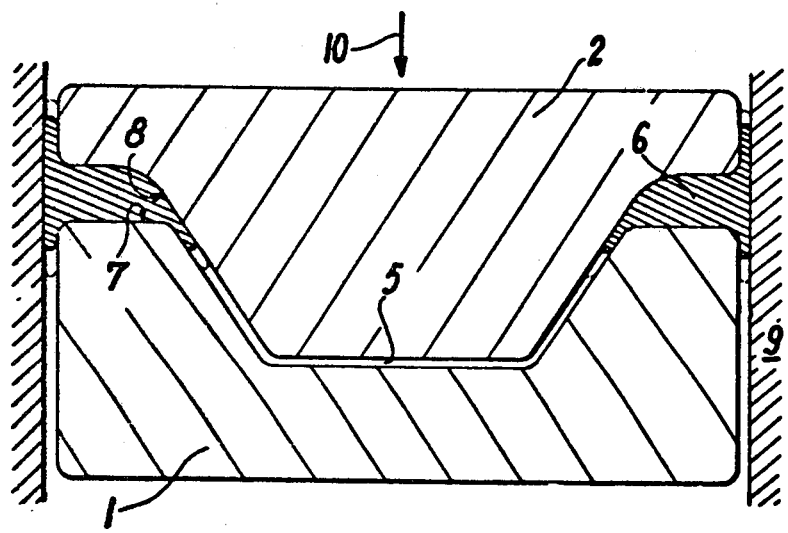
Figure 9:
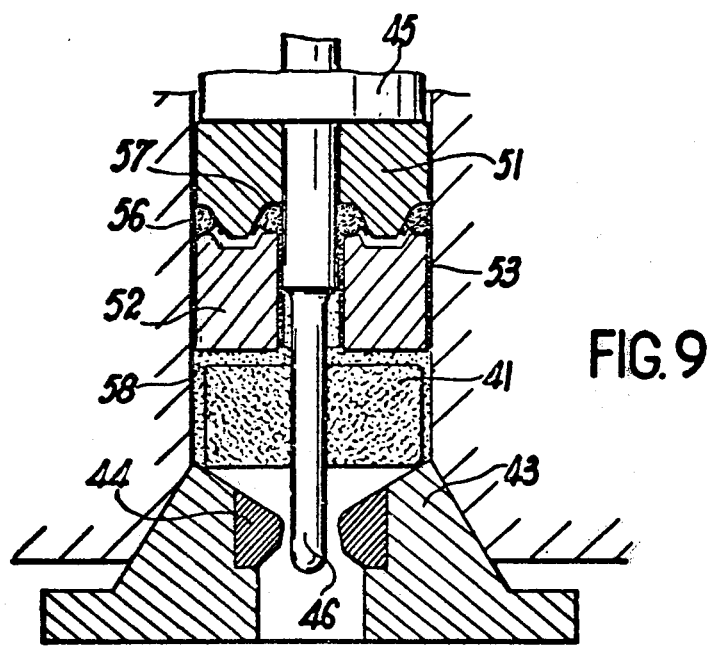
Figure 11:
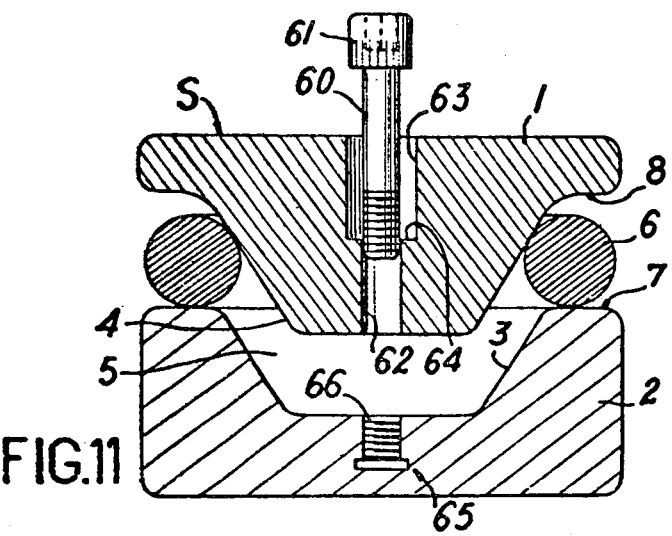
Figure 12:
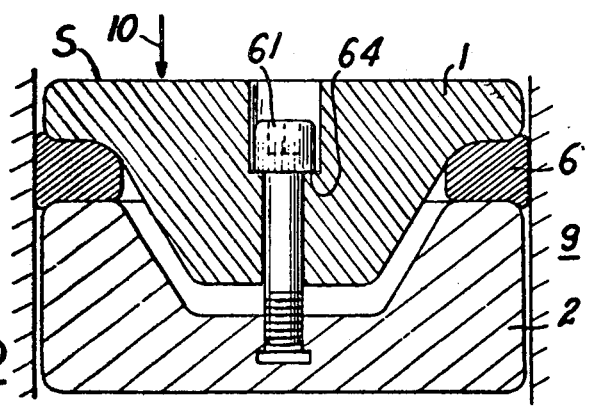
Figure 13:
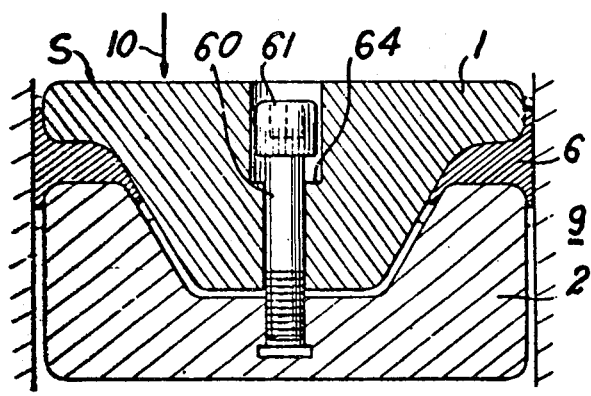

FIG. 9 relates to another alternative form of construction which is more especially suited to a press for the extrusion of tubular elements;

FIG. 10 is a sectional view of the seal employed in the alternative form of FIG. 9;

and finally, FIGS. 11, 12 and 13 are views which are similar to FIGS. 1, 2 and 3 but in which a unidirectional coupling is provided between the supporting members.

As is apparent from FIGS. 1, 2 and 3, the dynamic sealing device in accordance with the invention is essentially constituted by two supporting members 1 and 2 which are formed especially of high-tensile steel and preferably have the same diameter. Said members have a common axis in the direction of which a thrust can be exerted with a constant or variable force, the pressure on the members being equal to the ratio of said force to the area S of either of the two supporting members. Said members are advantageously provided with complementary conical bearing surfaces designated by the reference numeral 3 in the case of the member 1 and the reference numeral 4 in the case of the member 2 so as to permit of respective engagement and centering of said members relative to each other while maintaining a small clearance 5 between these latter. The supporting members 1 and 2 are provided in the vicinity of their periphery with a sufficient relief to permit an annular seal 6 to be imprisoned between said members. Particularly in the example of FIG. 1, said seal is designed in the form of an O-ring which is preferably made of steel although any suitable metal or material remains open to selection according to the conditions of temperature and pressure which are contemplated. When placed in position, the annular seal 6 rests against the members 1 and 2 by means of bearing surfaces 7 and 8. The bearing surface 7 which has a flat shape and is formed on the member 1 has a small surface area $S_1$ which is appreciably smaller than the area of the surface S at which the thrust is applied to the members 1 and 2 of the device; said bearing surface 7 extends transversely at right angles to the axis of the members. On the other hand, the bearing surface 8 at which the second member 2 is applied against the seal 6 is inclined to said axis so that the normal at the point of contact of said bearing surface with the seal is directed towards the exterior of the supporting members 1 and 2.

The device which is constituted by the two members 1 and 2 and the seal 6 fitted between these latter is mounted within a cylindrical bore or more generally disposed in the vicinity of a surface 9 with respect to which pressure-tightness is to be maintained at the time of displacement of said members in front of said surface under conditions of high pressure and temperature.

In order to explain the operation of the device, it is postulated that the member 1 is subjected to a static thrust load which should be balanced and slightly exceeded in order to obtain a simultaneous displacement of both members and of their seal in the direction of the arrow 10. To this end, a progressively increasing force F is applied to the second member, thereby subjecting the seal to two flattening or compressive pressures $P_1$ and $P_2$ of equal value and in the ratio of said force F to the respective areas of the bearing surfaces $S_1$ and $S_2$. Said pressures are directed along the normal to the bearing surface 7 and consequently in the direction opposite to the force F in the case of the member 1 and along the normal to the inclined bearing surface 8 in the case of the member 2, that is to say towards the exterior of the assembly which is formed by the members 1 and 2. The deformation of the seal 6 then takes place until the surface areas $S_1$ and $S_2$ which remain constantly equal correspond to the arrangement shown in FIG. 2 with adaptation of the shape of the seal to that which is given by design to the members 1 and 2 in this zone.

As the pressure continues to increase, the seal 6 (as shown in FIG. 3) is subjected to creep deformation. Owing to the direction of the resultant of the forces applied, said creep deformation takes place preferentially towards the exterior of the members 1 and 2 between these latter and the surface 9, thereby contributing to the pressure-tightness of the clearance which is formed between said members. Progressively as the pressure increases, said creep deformation becomes correspondingly greater until the moment when the thrust exerted on the member 2 balances the static thrust exerted in the opposite direction on the member 1. From this moment, the simultaneous displacement of the members with respect to the surface 9 takes place and the seal 6 achieves continuous dynamic pressure-tightness.

Figure 4:
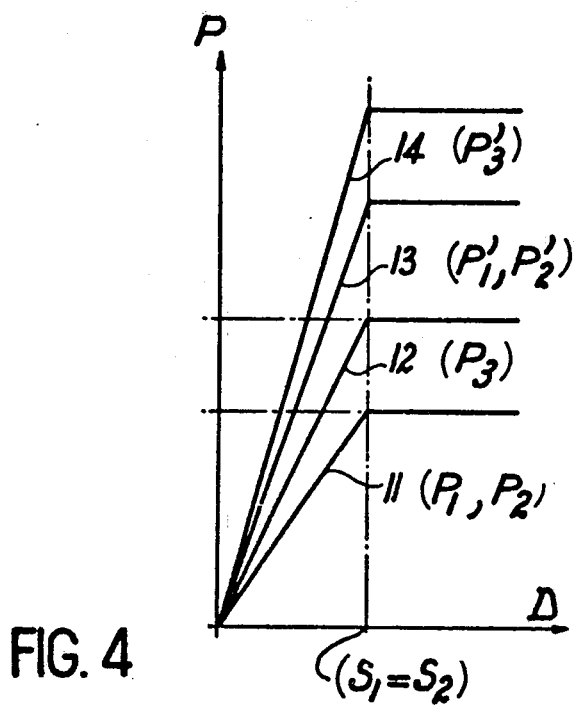
FIG. 4 is a graphical representation of the pressures which are developed as a function of the movements of displacement.

The diagram of FIG. 4 in which the pressures are plotted as ordinates and the displacements as abscissae shows at 11 the development of the pressure which is exerted on the members and which increases simultaneously with their application surface areas $S_1$ and $S_2$, whilst the maximum ordinate in respect of a given application force F corresponds to the case of FIG. 2. Above this value, these pressures remain constant. Similarly, the curve 12 shows that the resultant of the pressures exerted on the seal 6 by the members 1 and 2 is continuously greater than the previous values $P_1$ and $P_2$ whilst the directional creep deformation of the seal which is produced correlatively continuously maintains the desired pressure-tightness. Moreover, if for any reason the application force F were to vary or to increase, for example, it is immediately apparent that the curves 11 and 12 undergo a corresponding displacement at 13 and 14 respectively, the pressures $P'_1$ and $P'_2$ on the one hand and the pressure $P'_3$ on the other hand being multiplied in the ratio of the forces. The seal 6 alone is consequently subjected to a higher creep stress and is thus caused to fill the clearance between the supporting members and the outer surface to a more complete extent. Said members are thus permitted to carry out a displacement without interruption of pressure-tightness at any moment. A particular result thereby achieved in the case of the device herein described is to permit immediate adaptation to operating conditions both in regard to the state of surface of the oppositely-facing members since any defect or irregularity is immediately absorbed by the seal and in regard to variations in thrust load. There only takes place a progressive "consumption" of the seal without thereby directly affecting the pressure-tightness which is achieved.

In the example illustrated in FIGS. 1 to 4 which have been discussed in the foregoing, the seal considered is constituted by a simple metallic O-ring 6 which is mounted between the supporting members 1 and 2. As an advantageous feature and in order to introduce a further improvement in the characteristics of the device uner consideration, a strengthening member 20 as illustrated in different alternative embodiments in FIGS. 5 to 7 is associated with said O-ring seal. Said strengthening member 20 preferably comprises a thin cylindrical skirt 21 (as shown in FIG. 5) formed of metal which is suited to the operating conditions and provided at one extremity with a substantially circular flange 22 which is intended to cover the O-ring seal 6.

In the alternative form of FIG. 6, the skirt 21 is surrounded externally by a second skirt 23 and this latter is preferably formed of a material which is different from that of the first; in particular, the first internal skirt 21 can be formed of steel and the second external skirt may be formed of copper since this material is more readily capable of creep deformation at the temperatures and pressures employed. Finally, in the case of FIG. 7, the flange 22 which is formed at the top of the skirt 21 has a slightly different shape and is substantially rectangular in this example.

Figure 8:
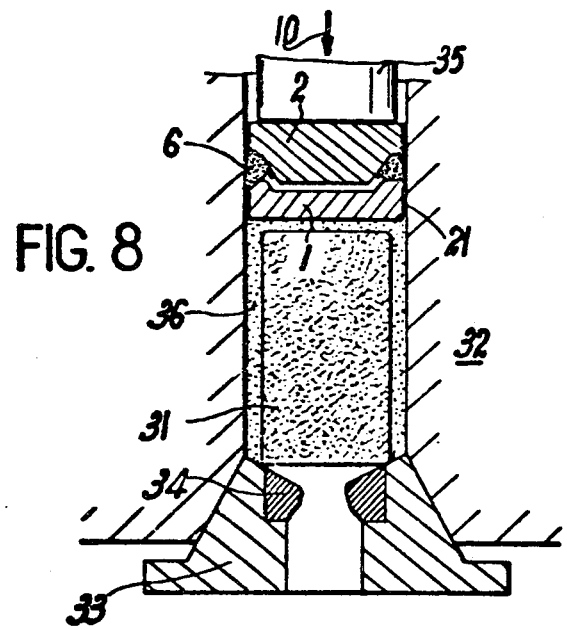
FIG. 8 is a diagrammatic axial sectional view of a press which is employed for the hot extrusion of solid metal billets and which makes use of a dynamic sealing device in accordance with the invention.

In FIG. 8, there is shown diagrammatically a press for the hot extrusion of metal billets in which a dynamic sealing device in accordance with the invention is employed. In this figure, the billet has the shape of a cylindrical block 31 which is placed within the interior of an extrusion chamber 32, the lower end of which is fitted with a support 33 for a die 34 against which the extremity of the billet is applied. At the opposite end, the chamber 32 is adapted to receive an extrusion ram 35 which is intended to exert the necessary force on the billet to cause this latter to pass through the die 34 under predetermined conditions of temperature.

In accordance with the invention, there is placed between the ram 35 and the billet 31 a dynamic sealing device as constructed in accordance with any one of the embodiments hereinabove described so as to obtain between the internal wall of the extrusion chamber 32 and the supporting members 1 and 2 of the seal 6 the degree of pressure-tightness which is essential in particular to prevent the lubricant 36 which is distributed within the extrusion chamber 32 between the internal surface of this latter and the billet 31 from escaping towards the rear. The force exerted by the ram 35 on the members 1 and 2 which serve to form a dummy block in fact results in accordance with the arrangements hereinabove described in the preliminary creep deformation of the seal 6 and of its strengthening skirt 21, said deformation being then maintained throughout the extrusion process. During the process, the billet 31 becomes plastic under the combined action of pressure and temperature and is then progressively discharged from the extrusion chamber through the orifice of the die 34, lubrication of the billet being continuously maintained by virtue of the presence of the dynamic seal which prevents any leakage towards the rear of the chamber.

FIG. 9 illustrates another alternative form of construction in which the dynamic sealing device in accordance with the invention is adapted for application to a press for the hot extrusion of tubular elements 41. There is again shown in this figure the extrusion chamber 32, the support 43 for the die 44 and the press ram 45; however, the ram is provided in this case with an axial mandrel 46 which traverses the chamber 42, the die 44 and the billet 41 to be extruded. In this alternative form, the device comprises two supporting members 51 and 52 which are slightly modified with respect to the members 1 and 2 for a dynamic seal which is shown on a larger scale in FIG. 10. This seal comprises a double cylindrical skirt 53 provided at one extremity with two circular flanges 54 and 55, the two members 51 and 52 being adapted to interengage and to imprison beneath the flanges 54 and 55 two O-rings 56 and 57 respectively. Under the pressure applied by the ram 45 and transmitted to the members 51 and 52, said O-rings are subjected to outward creep deformation, thereby achieving the necessary pressure-tightness in this case, not only between the internal surface of the extrusion chamber 42 and the opposite surface of the supporting members 51 and 52 but also between said members and the outer surface of the axial mandrel 46. The lubricant 58 which is contained within the extrusion chamber around the billet can therefore not escape towards the rear end of the ram and permits constant and continuous lubrication during the extrusion operation.

Finally, FIGS. 11, 12 and 13 illustrate the supporting members 1 and 2 which are interassembled by means of a unidirectional coupling which mainly comprises a cylindrical screw 60 having a head 61 which is capable of passing freely through a bore 62 formed through the first supporting member 1. There is formed at the top end of the bore 62 a counter-bore 63 which permits the engagement of the head 61 of the screw 60 up to a position in which said head 61 is abuttingly applied against an annular shoulder 64. Provision is made in the second supporting member 2 for a blind-end bore 65 located opposite to the bore 62 and provided with an internal screw-thread 66 which is intended to cooperate with the extremity of the screw 60.

In FIG. 11, the seal 6 is shown in the initial stage of assembly in the form of a simple metallic O-ring which is placed prior to utilization without clamping between the members 1 and 2.

FIG. 12 corresponds to the preliminary operation of cold calibration of the seal 6 to the dimensions either of the bore 9 in which the work is to be performed or of a cylindrical bore which is identical but separated from the press, the seal being inserted in the press after calibration. In this preliminary operation, the seal 6 is subjected to limited outward creep deformation to the dimension of the diameter of the calibration bore as obtained by applying a relatively small axial force to the members 1 and 2. On completion of this calibration operation, the assembly which consists of the two members 1 and 2 is maintained in position by tightening of the screw 60 within the internally-threaded bore 65, the head 61 of said screw being abuttingly applied against the annular shoulder 64 of the member 1. The different operations mentioned above are carried out by hand prior to actual use of the dynamic seal for an extrusion operation in particular.

FIG. 13 corresponds to the work phase of the seal in which this latter provides continuous leak-tightness at high values of pressure and temperature between the members 1 and 2 and the bore 9. In this case, the effort exerted on the supporting members 1 and 2 is transmitted to the seal 6 with a multiplication of this effort in the ratio of contacting sections in the manner which has already been stated in reference to FIGS. 1 to 3. During operation, the head 61 of the screw 60 is free within the counter-bore 63 and the members 1 and 2 are consequently not hindered in their opposite relative movements of displacement, thereby satisfying the requisite operating conditions at each moment. Moreover, when the work of the seal is completed, the members 1 and 2 can readily be disassembled simply by slackening-off the screws and removing the remaining portion of the seal.

No matter which alternative form of construction may be adopted, the use of any suitable liquid or gaseous lubricant may be contemplated since any leakage of this latter is continuously prevented irrespective of the fluidity of said lubricant. This applies in particular to the conversion by hot extrusion of billets of metal (for example of beryllium, of zirconium, of alloys formed between these elements, or any grade of steel and in particular heat-resisting steels), especially in the case of temperatures which are either higher than or equal to 1000° C and under pressures of the order of 12,000 bars. Extrusion is carried out in all cases with a homogeneous layer of lubricant at the periphery of the billet, the extruded product being consequently endowed with a remarkable state of surface. The absence of friction during the extrusion operation additionally makes it possible to employ all the available force solely for the deformation of the metal, thereby permitting very substantial elongations. Finally, the removal of frictional stresses permits uniform deformation and consequently excellent homogeneity of the extruded product, all sections of which undergo identical deformations. Moreover, it should be noted that this seal can be employed for both conventional and hydrostatic extrusion processes.

Further noteworthy advantages are gained by providing a unidirectional coupling between the supporting members. In fact, the addition of said unidirectional coupling between members 1 and 2 does not have any influence on the particular shape which is given to the seal and this latter can either have a generally toric configuration or have the shape of a cup with flat edges. In all cases, the head of the screw is free within its recess during operation and is thus capable of axial displacement with respect to the first member. Finally, irrespective of the form of coupling employed, the sealing device can be carried directly by the ram of a press or alternatively be employed as a dummy block in order to carry out the extrusion of bars or tubes by the hydrostatic process or otherwise, whether the press is either vertical or horizontal.

It will naturally be understood that the invention must not be considered as limited to the forms of construction and application which have been more particularly contemplated and in which the dynamic sealing device is employed in a hot-extrusion press. Thus, a large number of other similar applications could be considered, especially for sintering materials at high temperatures and under high pressure, in the case of thermopneumatic cladding units, for the formation of leak-tight passages in high-temperature pressure vessels and for the production of pressure-tightness between the piston and the cylinder of a jack which operates at high temperature.

What we claim is:

1. A dynamic sealing system for high-temperature and high-pressure operation in presses for hot extrusion of billets, the presses having an extrusion chamber, a billet in the chamber, a die through which the billet is forced and a ram exerting extrusion force on the billet, the dynamic sealing system being interposed between the ram and the billet in the extrusion chamber comprising first and second supporting members interengaging with clearance along a common axis of the application of a thrust on said members, a metallic O-ring seal imprisoned between said members adjacent the periphery thereof, a flat bearing surface of small cross-sectional area on said first member applied against said seal and extending at right angles to said axis, an inclined bearing surface on said second member applied against said seal in the direction of the exterior of said second member, said members subjecting said seal within said clearance to permanent creep deformation under pressure toward the exterior of said members under a compressive force which is greater than said thrust in the ratio of the area of said flat bearing surface to the area of application of said members and a thin metallic cylindrical skirt terminating at one extremity in an inwardly directed and substantially annular flange covering said O-ring and extending downwardly around said first member.

2. A dynamic sealing device in accordance with claim 1, said skirt including a plurality of thicknesses of materials.

* * * * *